United States Patent
Varano et al.

[19]

[11] Patent Number: 5,964,400
[45] Date of Patent: Oct. 12, 1999

[54] MULTI-LAYERED INSULATED CUP FORMED FROM FOLDED SHEET

[76] Inventors: Richard Varano, 156 Waterville Rd., Avon, Conn. 06001; Claus E. Sadlier, 2221 Steiner St., San Francisco, Calif. 94115

[21] Appl. No.: 08/876,005

[22] Filed: Jun. 13, 1997

Related U.S. Application Data

[63] Continuation-in-part of application No. 08/641,213, Apr. 30, 1996, Pat. No. 5,660,326, which is a continuation-in-part of application No. 08/516,913, Aug. 18, 1995, abandoned.

[51] Int. Cl.⁶ ..................................................... B65D 3/22
[52] U.S. Cl. .......................... 229/403; 229/4.5; 229/400; 229/939
[58] Field of Search ....................... 229/4.5, 5.5, 122.32, 229/400, 403, 939; 206/459.5; 40/324; 220/669–674; 428/34.2, 182, 187

[56] References Cited

U.S. PATENT DOCUMENTS

| | | | |
|---|---|---|---|
| 154,498 | 8/1874 | Long ........................................... | 229/90 |
| 411,096 | 9/1889 | Eaton et al. .............................. | 220/671 |
| 1,091,526 | 3/1914 | Moore ....................................... | 229/5.5 |
| 1,098,178 | 5/1914 | Semple ..................................... | 229/939 |
| 1,158,581 | 11/1915 | Swift ......................................... | 229/5.5 |
| 1,208,483 | 12/1916 | Chesbrough ............................. | 229/939 |
| 1,284,728 | 11/1918 | Luellen ..................................... | 229/4.5 |
| 1,297,152 | 3/1919 | Hackney ................................... | 229/4.5 |
| 1,334,302 | 3/1920 | Hicks ........................................ | 229/4.5 |
| 1,665,033 | 4/1928 | Jensen ...................................... | 229/939 |
| 1,771,765 | 7/1930 | Benson ..................................... | 229/400 |
| 1,850,013 | 3/1932 | Hinkley .................................... | 229/4.5 |
| 2,051,076 | 8/1936 | Deakin ..................................... | 156/191 |
| 2,155,487 | 4/1939 | Hatch ....................................... | 229/5.5 |
| 2,266,828 | 12/1941 | Sykes ....................................... | 229/403 |

(List continued on next page.)

FOREIGN PATENT DOCUMENTS

| | | | |
|---|---|---|---|
| 371918 | 6/1990 | European Pat. Off. . | |
| 649299 | 1/1951 | United Kingdom ..................... | 229/4.5 |
| 1167861 | 10/1969 | United Kingdom . | |
| 1366310 | 9/1974 | United Kingdom . | |

*Primary Examiner*—Gary E. Elkins
*Attorney, Agent, or Firm*—David Pressman

[57] ABSTRACT

An elongated blank (10) is used to form a thermally insulated cup (30). The blank includes a pair of spaced apart smooth portions (12, 13) connected by a middle portion (11). The blanks may have chamfered or trimmed corners to reduce the amount of waste on the sheet from which they are cut. The smooth portions are folded on opposite sides of the middle portion. The middle portion is corrugated or otherwise distorted or deformed to create air space. The folded sheet is wound around a mandrel to form a cylinder or conoid. The ends of the smooth portions are joined together, and a bottom closure (14) is attached to form the cup. The finished cup includes a smooth outer shell (12S), a smooth inner shell (13S), and a middle layer (11L) sandwiched therebetween. The middle layer forms many air spaces between the shells to thermally insulate the contents of the cup, and also provide structural strength. The outer shell may have embossing for greater resistance to slippage through one's hands and better insulating properties. The cup can be constructed of paper, which makes it biodegradable and recyclable, and its simple construction method makes it easy and inexpensive to manufacture using standard, conventional machinery. One, two, or all three layers of the cup's sidewall may be rolled over to form a top rim with added rigidity. In an alternative embodiment (FIG. 5A), the starting blank may have the insulating portion (34) at one end instead of the middle, and it is suitably folded so that the insulating layer comes out as a middle layer (FIG. 6A). In another embodiment, the insulating portion (34') may be provided as a separate piece of insulating material. In another embodiment, the starting blank has just two sections (FIG. 7A) and it is similarly folded and wound so that the cup has two layers, an outer deformed layer (34) and an inner smooth layer (32).

3 Claims, 10 Drawing Sheets

U.S. PATENT DOCUMENTS

| | | | |
|---|---|---|---|
| 2,444,861 | 7/1948 | Symmes | 206/525 |
| 2,457,198 | 12/1948 | Bell | 229/4.5 |
| 2,512,602 | 6/1950 | Bell | 229/4.5 |
| 2,563,352 | 8/1951 | Morse | 229/403 |
| 2,591,578 | 4/1952 | McNealy | 229/403 |
| 2,661,889 | 12/1953 | Phinney | 229/4.5 |
| 2,828,903 | 4/1958 | Adkins | 29/403 |
| 2,830,005 | 4/1958 | Jackson | 428/187 |
| 2,917,215 | 12/1959 | Psaty et al. | 229/400 |
| 2,954,913 | 10/1960 | Rossman | 229/939 |
| 3,001,683 | 9/1961 | Goodwin et al. | 229/406 |
| 3,079,027 | 2/1963 | Edwards | 229/400 |
| 3,194,468 | 7/1965 | Baron | 229/400 |
| 3,383,025 | 5/1968 | Ferrey et al. | 229/4.5 |
| 3,410,473 | 11/1968 | Petrie | 229/4.5 |
| 3,443,715 | 5/1969 | Edwards | 220/671 |
| 3,456,860 | 7/1969 | Janninck | 229/400 |
| 3,503,310 | 3/1970 | Goetz | 229/400 |
| 3,908,523 | 9/1975 | Shikaya | 229/939 |
| 4,261,501 | 4/1981 | Watkins et al. | 229/404 |
| 4,347,934 | 9/1982 | Goodman | 229/4.5 |
| 4,398,650 | 8/1983 | Holmes et al. | 229/939 |
| 4,578,329 | 3/1986 | Holsappel | 206/459.5 |
| 4,836,400 | 6/1989 | Chaffey et al. | 229/400 |
| 4,842,906 | 6/1989 | Ekdahl et al. | 206/459.5 |
| 4,993,580 | 2/1991 | Smith | 229/939 |
| 5,092,485 | 3/1992 | Lee | 229/403 |
| 5,102,036 | 4/1992 | Orr et al. | 229/89 |
| 5,145,107 | 9/1992 | Silver et al. | 229/4.5 |
| 5,205,473 | 4/1993 | Coffin | 229/403 |
| 5,226,585 | 7/1993 | Varano | 229/403 |
| 5,256,131 | 10/1993 | Owens et al. | 493/374 |
| 5,259,529 | 11/1993 | Coale | 220/739 |
| 5,326,019 | 7/1994 | Wolff | 229/403 |
| 5,363,982 | 11/1994 | Sadlier | 229/403 |
| 5,415,339 | 5/1995 | Howard | 229/403 |
| 5,425,497 | 6/1995 | Sorensen | 229/403 |
| 5,454,484 | 10/1995 | Chelossi | 220/738 |
| 5,460,323 | 10/1995 | Titus | 229/403 |
| 5,542,559 | 8/1996 | Sobol | 229/403 |
| 5,547,124 | 8/1996 | Mueller | 229/403 |
| 5,660,326 | 8/1997 | Varano et al. | 229/4.5 |
| 5,697,550 | 12/1997 | Varano et al. | 229/4.5 |
| 5,766,709 | 6/1998 | Geddes et al. | 229/403 |
| 5,857,615 | 1/1999 | Rose | 229/403 |

MULTI-LAYERED INSULATED CUP FORMED FROM FOLDED SHEET

CROSS-REFERENCE TO RELATED CASES

This invention is an improvement upon that of U.S. Pat. No. 5,363,982 to C. E. Sadlier, granted Nov. 15, 1994. This application is a continuation-in-part (CIP) of application Ser. No. 08/641,213, filed Apr. 30, 1996 now patent 5,660,326, granted Aug. 26, 1997, which in turn is a CIP of application Ser. No. 08/516,913, filed Aug. 18, 1995, now abandoned.

BACKGROUND

1. Field of Invention

This invention relates generally to disposable containers, specifically to an insulated cup made of sheet material.

2. Prior Art

There are three main types of disposable cups now in use: polystyrene, expanded resin, and paper.

Polystyrene cups are aesthetically pleasing, but they can be used only for holding cold drinks, and are not biodegradable or easily recyclable.

Cups of expanded synthetic resin material, sold under the trademark Styrofoam, are excellent thermal insulators, so that they can maintain the temperature of a drink, whether hot or cold, for long periods of time. They are comfortable to handle because their exteriors stay close to ambient temperature, regardless of the temperature of the drink. However they are environmentally unfriendly because they are not biodegradable or easily recyclable. As a result, they are being banned from many municipalities.

Standard single-layer paper cups are recyclable and biodegradable and therefore more environmentally sound. However they are poor thermal insulators, so that a beverage in a paper cup quickly warms (if cold) or cools (if hot). They are also uncomfortable to handle because a hot or cold drink can burn or uncomfortably cool a hand. Also a cold drink will cause condensation to appear on the outside, making a paper cup slippery and difficult to hold. Their single-layer construction makes them fragile, so that large cups filled with liquid easily crumble after prolonged handling.

Multi-layered paper cups have been designed for providing thermal insulation and increased strength. U.S. Pat. Nos. 2,661,889 to Phinney (1948), 4,993,580 to Smith (1991), 5,092,485 to Lee (1992), and 5,205,473 to Coffin (1993) show three-layered cups with smooth outer and inner shells, and a corrugated middle layer. The corrugated layer provides air pockets or spaces for thermal insulation and added strength to withstand prolonged handling.

Although strong and thermally efficient, these cups are all expensive and impractical to manufacture because their three layers are formed separately and then assembled together. This requires at least three adhesive joints for the forming the layers into "tapered cylinders" (conoids), two adhesive joints for assembling the layers together, and an adhesive joint for attaching the bottom. Some cups require even more adhesive joints. The liberal use of glue renders the cups difficult or impossible to recycle. The layers are usually formed from blanks cut separately from sheets, so that they do not make the most efficient use of paper and machinery time. Furthermore, the extra steps slow the production process, prevent the cups from being made on standard, existing cup-forming machinery. Also they increase manufacturing overhead and direct labor allocation, so that the prior-art cups are expensive. As a result, these cups have never achieved commercial success.

Although similar in its multilayered design, conventional corrugated boxboard also has never achieved commercial success for use in forming conoidal drinking cups because its layers are permanently fixedly adhered to one another. This makes it physically impracticable to bend or wrap boxboard into a smooth conoidal shape.

Often establishments selling very hot or cold beverages in paper cups will use double or nested cups to avoid the above problems of single paper cups, but doubling cups is time consuming and expensive.

The above Sadlier patent discloses a three-layered cup having smooth outer and inner layers and a corrugated middle layer, all formed of one continuous sheet wound in a spiral. Although more economical to manufacture than prior-art cups, this cup preferably is made by unidirectionally winding three layers on a spinning mandrel. It therefore cannot be readily manufactured by existing mass production cup-forming machinery, which typically wraps a cup's sidewall blank vertically into a conoidal shape, around a nonspinning mandrel.

The cup of the above Sadlier patent, and the cups of the above CIP applications, while a major improvement over existing cups, have an outer layer or shell which sometimes tends to slip down through the holder's fingers, especially when filled with liquid. Also such cups' insulating properties, while far superior to existing cups, especially considering the amount of material used, are not as great as possible. Further, such cups are not as comfortable to hold as is desirable since the area of contact between the holder's fingers and the cup is large, resulting in a relatively large amount of heat transfer, making the cup less comfortable to hold when it contains cold or hot liquid. In addition, prior-art-single-walled cups usually are printed on the outside to show graphics or the trademark of their manufacturer or a fast-food chain that dispenses them; such printing uses ink that consumes natural resources, makes recycling more difficult, and requires an extra step in production for printing. Such single-walled cups cannot be embossed instead of printed with such graphics or trademarks since their single-walled construction may leak when they are embossed. Another disadvantage of the cups of the Sadlier patent is that they are made of paper blanks which are cut from large sheets in a manner which leaves relatively large wasted areas or trimmings left on the blank. Finally these cups are not as rigid as possible and can be crushed or folded by squeezing them with less force than would be desirable.

Objects and Advantages

Accordingly, several objects and advantages of the invention are to provide a cup which (a) is thermally insulating for comfortable handling and for maintaining the temperature of its contents, (b) is sturdy enough to withstand prolonged handling, (c) can be made of biodegradable and recyclable materials, (d) is easy and inexpensive to manufacture, (e) can be made by existing machinery, (f) has less tendency to slip down through a holder's fingers, especially when filled with liquid, (g) has greater insulating properties, (h) can be cut from a large sheet in a manner which leaves less waste areas or trimmings on the sheet, (i) is more rigid and resistant to crushing or folding, (j) provides a reduced area of hand contact when held so as to reduce the amount of heat transmission, either when filled with cold or hot liquid, (k) can be embossed on the outside with graphics or a trademark, and (l) does not have to be printed so as to save ink, natural resources, production costs, production steps, and make recycling easier.

Other objects are to provide an insulated cup which is simpler in construction, more economical to fabricate, can be fabricated in a variety of ways, does not require unidirectional winding on a spinning mandrel, and can be fabricated in one continuous in-line production process (from folding the blank to wrapping it around a mandrel to form a cylindrical or conoidal shell).

Further objects and advantages will become apparent from a study of the following description and the accompanying drawings.

Summary

In accordance with one embodiment of the invention, a thermally insulated cup is formed from one continuous, homogeneous sheet of paper having two spaced-apart smooth end or outer portions connected by a corrugated or otherwise deformed and insulating middle portion. The smooth end portions are folded over opposite sides of the corrugated portion. The folded sheet is wrapped or bent around a mandrel to form conoidal inner and outer shells that sandwich the corrugated portion therebetween. The ends of each smooth portion are sealed together. A bottom closure is attached to the inner shell. The resulting three-layered cup is strong, offers good thermal insulation for comfortable handling and for-maintaining the temperature of its contents, and can be formed on existing machinery. Alternatively the continuous sheet may be formed of separate sections which are adhered together. Further, the corrugated or otherwise insulating portion can be an outer, rather than a middle, portion. Moreover the starting sheet can have two portions, so that after folding, it is wrapped into a two-layered insulated cup, with the corrugated layer on the outside. In the three-layered embodiment, the outer shell may have embossing for greater resistance to slippage through one's hands and better insulating properties. The sidewall blanks may have chamfered or trimmed corners to reduce the amount of waste on the sheet from which they are cut, and one, two, or all three layers of the cup's sidewall may be rolled over to form a top rim with added rigidity.

DRAWING FIGURES

FIG. 10A' shows a cross-section of part of one section of the blank of FIG. 10A.

Drawing Reference Numerals

| | | | |
|---|---|---|---|
| 10. | Continuous Sheet | 11. | Corrugated Portion |
| 11L. | Corrugated Layer | 12. | First Smooth Portion |
| 12B. | Bottom Edge | 12F. | Free End |
| 12P. | Proximal End | 12S. | Outer Shell |
| 12T. | Top Edge | 13. | Second Smooth Portion |
| 13B. | Bottom Edge | 13F. | Free End |
| 13P. | Proximal End | 13S. | Inner Shell |
| 13T. | Top Edge | 14. | Bottom Closure |
| 14R. | Bottom Closure Rim | 15. | Air Pockets |
| 16. | Waterproof Coating | 17. | Reflective Coating |
| 20. | Continuous Sheet | 21. | Corrugated Piece |
| 22. | Smooth Piece | 23. | Smooth Piece |
| 24. | Bottom Closure | 30. | Cup |
| 31. | Mandrel | 32. | Middle Section |
| 34. | Right Section | 36. | Fold Line |
| 38. | Flat Sheet | 40. | Score |
| 42 | (V & H) Ribs | 44. | Embossed Graphics |
| 46. | Dimples | 50. | Hole |
| 52. | (L & R) Bottom Corners | 54. | (L & R) Top corners |
| 56. | New Curved Cut Lines | 58. | Corner Cut Lines |
| 60. | Top Rim | | |

Figure 1A:
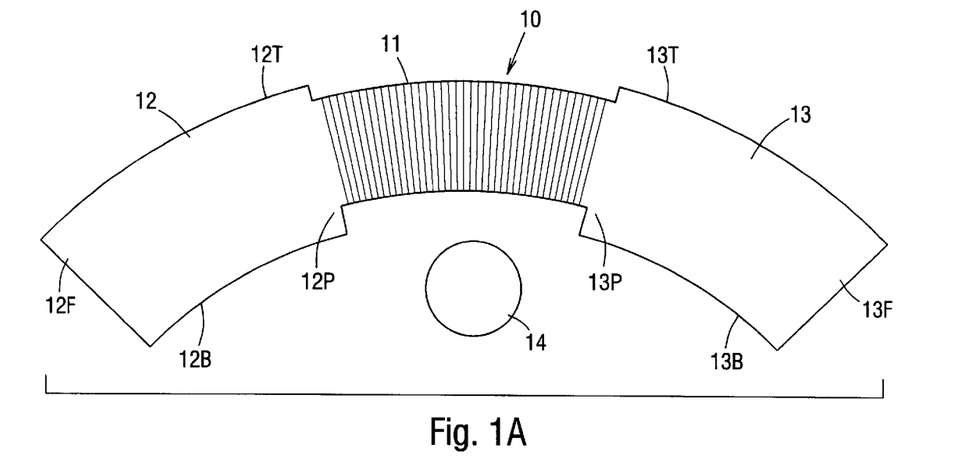
FIG. 1A is a plan view showing the components, in blank sheet form, for making a three-layered insulated cup employing a one-piece side component having a middle corrugated section, in accordance with one embodiment of the invention.
Figure 1B:
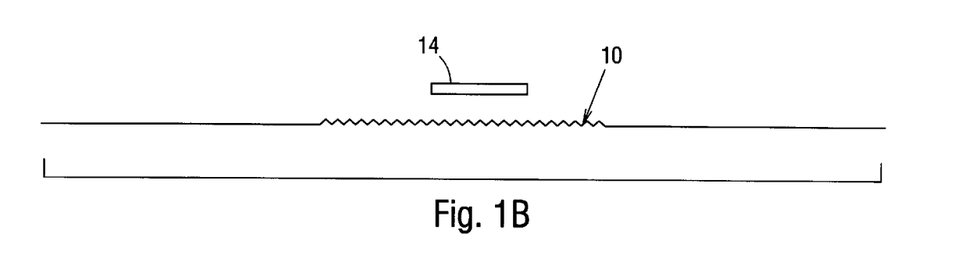
FIG. 1B is an edge view of the blank sheet components of FIG. 1A.
Figure 1C:
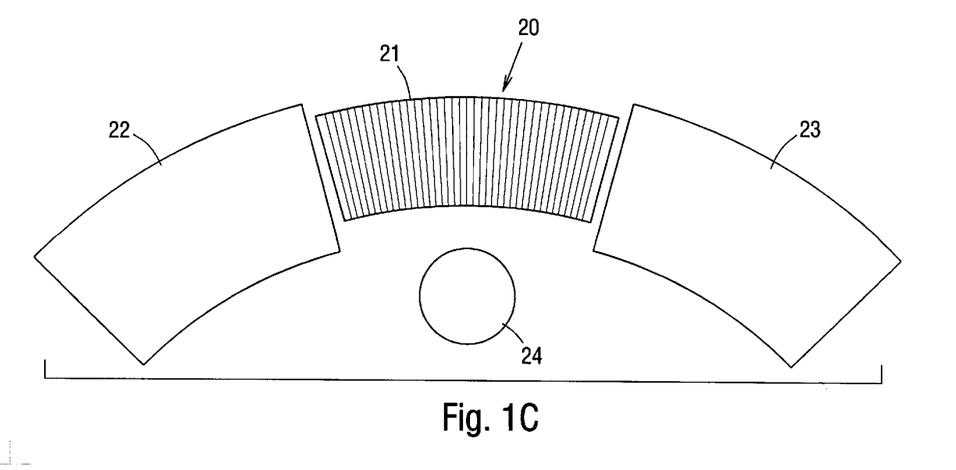
FIG. 1C is a plan side view similar to FIG. 1A, but where the side component is initially in three parts.

FIGS. 1A to 1C—Sheet Blanks

In accordance with a first embodiment of the invention shown in FIG. 1A, a cup or container (FIG. 4) begins as a continuous, homogeneous sheet 10, which is die cut from a larger sheet (not shown) of paper or another suitable sheet material. Sheet 10 includes an arc-shaped corrugated middle portion 11, and two longer, arc-shaped, first and second smooth end or outer portions 12 and 13, respectively, extending from the ends of corrugated portion 11. Smooth portions 12 and 13 have proximal ends 12P and 13P, respectively, free ends 12F and 13F, top edges 12T and 13T, and bottoms edges 12B and 13B. A round, bottom closure 14 is cut separately. The corrugations in portion 11 are clearly shown in the edge view of FIG. 1B. They are formed by methods well known in the art and are shown as having sharp folds, but alternatively can have rounded bends or bight portions.

In accordance with a second embodiment of the invention shown in FIG. 1C, a continuous sheet 20 is formed by gluing the appropriate edges of a corrugated piece 21 to separate smooth pieces 22 and 23. Bottom closure 24 is also cut separately. Corrugated piece 21 is slightly longer than corrugated portion 11 shown in FIG. 1A, so that its ends slightly overlap smooth pieces 22 and 23 for gluing. Cutting the three pieces separately may allow multiple types of sheet material to be used in fabricating sheet 20. E.g., recycled paper can be used for corrugated piece 21 and a type of paper known as SBS (solid bleach sulfite) can be used for smooth pieces 22 and 23.

In both embodiments (FIGS. 1A and 1B, as well as FIG. 1C), the corrugated middle portion (11 or 21) has a slightly lesser height than the end or outer portions, for a reason to be described.

Sheet 10 may be coated on at least one side with a waterproof coating. Some coatings, such as polyethylene, also serve as an adhesive when heated.

Figure 2A:
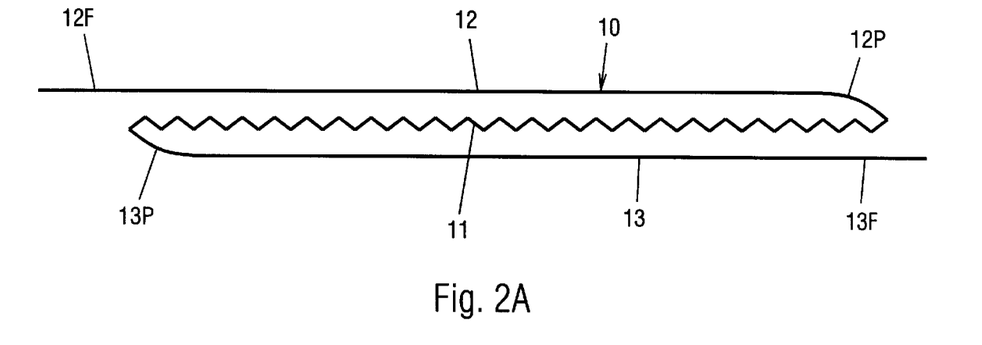
FIG. 2A is an enlarged edge view of the side component of FIG. 1A after folding, a stage in manufacturing.
Figure 2B:
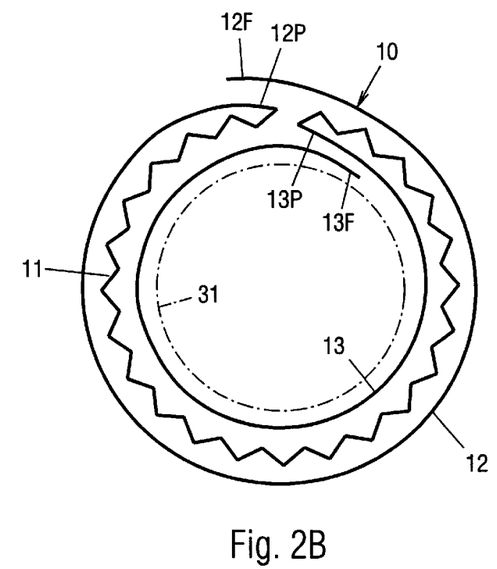
FIG. 2B is a top view of the side component after wrapping into a conoidal shape, another stage in manufacturing.

FIGS. 2A and 2B—Folding and Wrapping

The cup (FIG. 3) is formed as follows: Smooth portions 12 and 13 are folded on opposite sides of corrugated portion 11, as shown in FIG. 2A. Sheet 10 then consists of a flat three-layered arrangement, with a corrugated layer or portion sandwiched between the smooth outer layers or portions. Smooth portions 12 and 13 are longer than corrugated portion 11, so that their free ends 12F and 13F, respectively, extend beyond the ends of corrugated portion 11. A weak adhesive or tack, such as weak glue, elastic glue, or heated polyethylene may optionally be used to hold the folded, three-layered sheet flat until it is wrapped and sealed (described in the next paragraph). The adhesive may be applied by die cutting a small hole 50 (FIGS. 11A or 11B) in the middle layer so that a single drop of adhesive can be inserted to glue the inner and outer layers together without adhering the middle layer. This arrangement may make wrapping easier. The dimensions of the portions are selected according to the size of the cup being produced.

Sheet 10 is then wrapped around a tapered (conoidal) mandrel 31, as shown in FIG. 2B. The inner smooth layer is then completed by gluing or otherwise joining or sealing the excess portion at free end 13F to proximal end 13P through the application of a cold adhesive. Alternatively ends 13F and 13P may be adhered through the use of heated polyethylene or an alternative recyclable, biodegradable, heat-sealable material, which is applied to sheet 10 before the sheet is wrapped.

Similarly the outer smooth layer is then completed in a similar manner by gluing or heat sealing free end 12F to portion 12.

Figure 3:
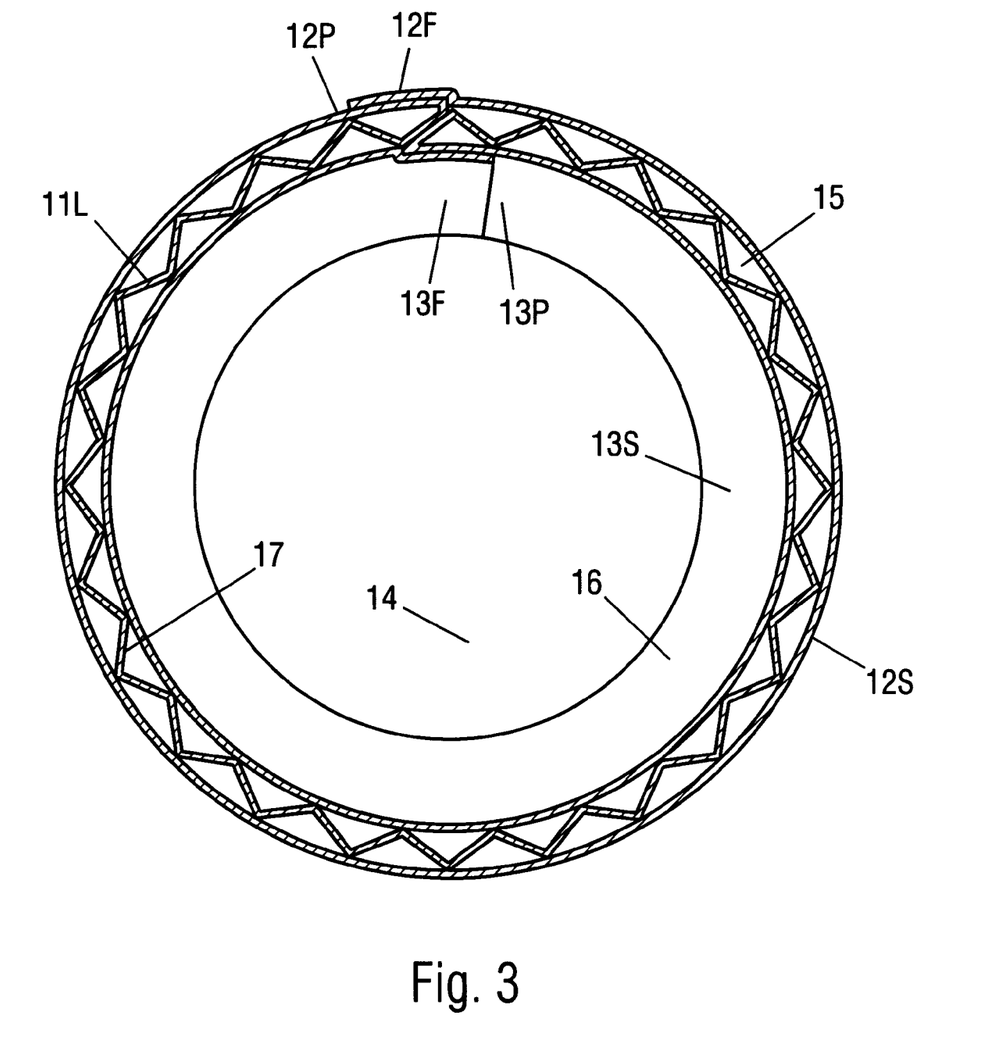
FIG. 3 is an enlarged top sectional view of the finished cup.
Figure 4:
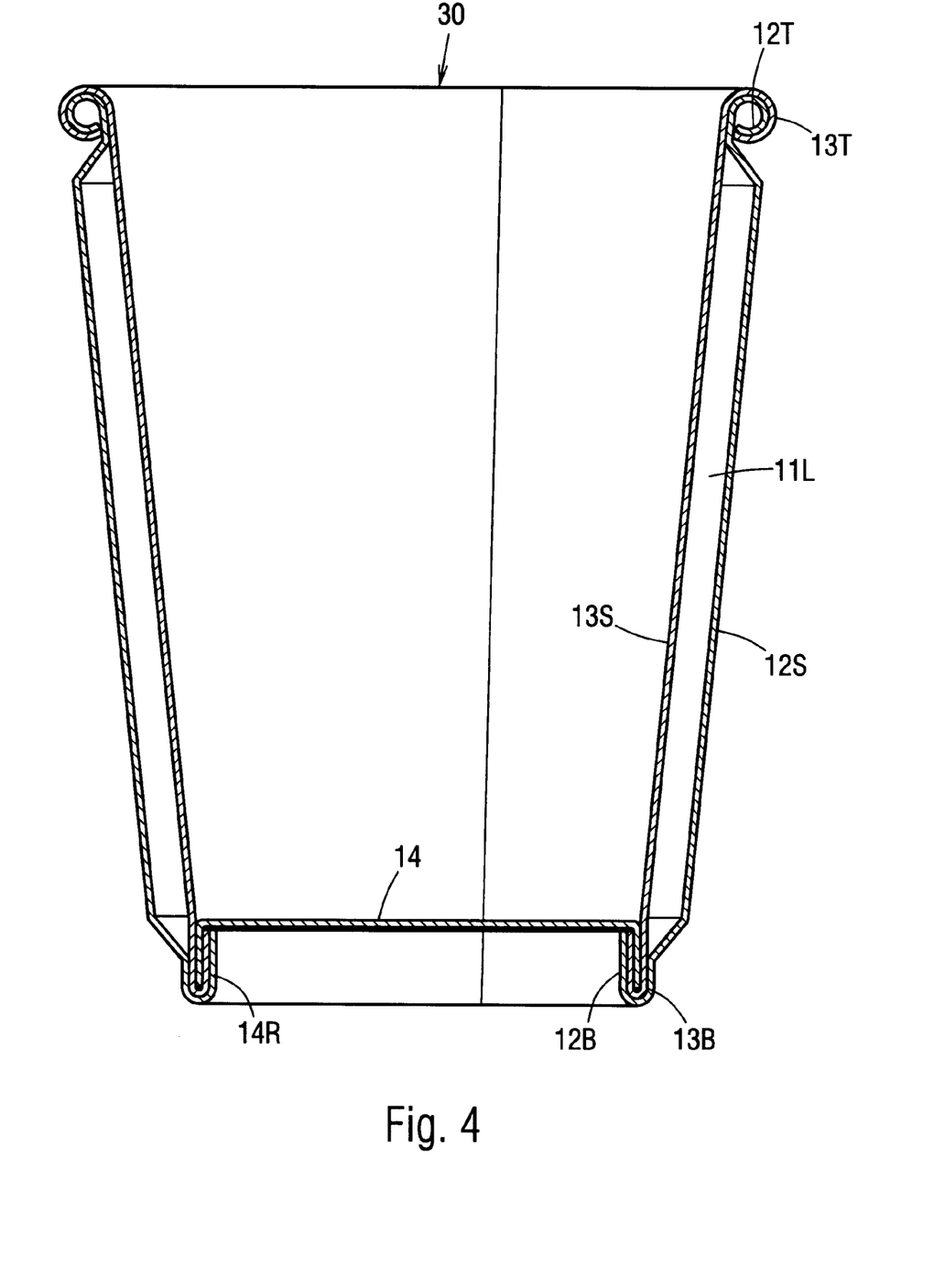
FIG. 4 is an enlarged side sectional view of the finished cup.

FIGS. 3 and 4—Sectional Views

Tapered conoidal inner shell 13S and outer shell 12S are thus formed and sealed, as shown in the top sectional view in FIG. 3. Corrugated portion 11 (FIG. 2B) is sandwiched between the shells to form a corrugated middle, insulating layer 11L. A bottom closure 14 is attached within inner shell 13S, as will be explained in conjunction with FIG. 4.

Smooth portion 12 (FIG. 2A) is longer than smooth portion 13 (FIG. 2A), so that after they are formed into conoids, outer shell 12S is larger in diameter than inner shell 13S for accommodating the thickness of corrugated layer 11L. Although sheet 10 is used in this example, sheet 20 (FIG. 1C) can also be used.

As thus constructed, corrugated layer 11L forms many thermally insulating air spaces 15 between it and the shells. If the cup is made with polyethylene-coated paperboard, it already has waterproofing material on it. Otherwise, it is coated with a suitable waterproofing material 16, such as plastic or wax. The inside surface of middle layer 11L is optionally coated with a reflective material 17. This will reflect radiant heat back to its source, whether from the cup's contents or from the air outside the cup, so that thermal efficiency is further improved. Because the three layers of the cup are constructed by simply folding and winding sheet 10 (FIG. 1A), it is very easy and economical to manufacture.

As shown in the side sectional view of FIG. 4, cup 30 includes three layers formed from outer shell 12S, corrugated layer 11L, and inner shell 13S. Top edges 12T and 13T are crimped together and rolled outwardly to form a rim. Bottom edges 12B and 13B are folded inwardly, and sealed to the inside of a rim 14R on bottom closure 14 for a watertight seal. Because corrugated portion 11 (FIG. 1A) is narrower than smooth portions 12 and 13 (FIG. 1A), the top and bottom edges of corrugated layer 11L stay clear of the crimped top and bottom of cup 30.

FIGS. 5A to 6B—Corrugated Portion at End

Figures 5A, 5B:
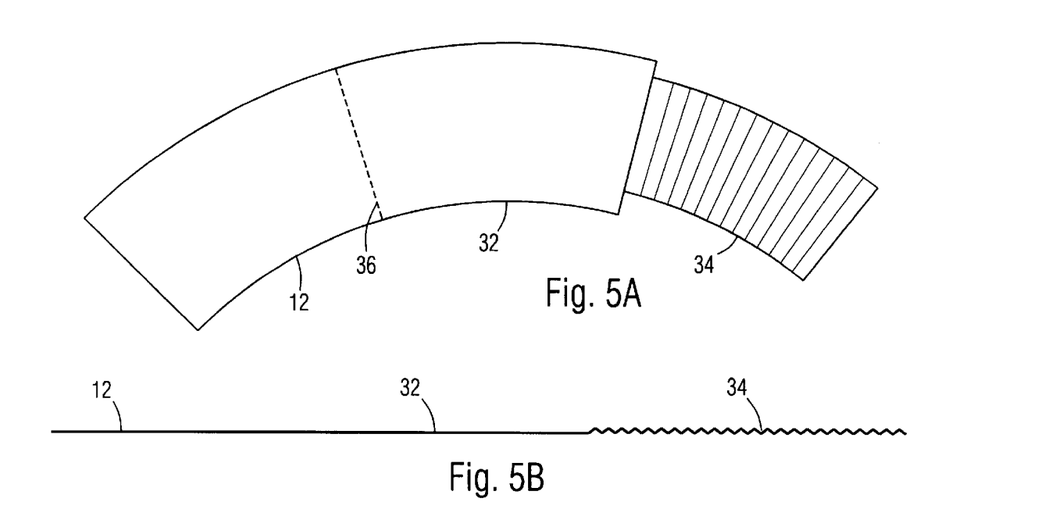
FIG. 5A is a plan view of a blank sheet for making a three-layered insulated cup employing a one-piece side component having an end corrugated section, in accordance with another embodiment of the invention.
FIG. 5B is an edge view of the blank sheet of FIG. 5A.

In lieu of providing the corrugated portion in the middle of the starting blank, as shown in FIG. 1A, the corrugated portion may be provided at one end of the starting blank, as shown in FIGS. 5A and 5B. Here the starting blank has three sections: a left end section 12, a middle section 32, a corrugated right end section 34. Left section 12 is identical to that of FIG. 1A. Middle section 32 is identical to end section 13 of FIG. 1A, but is now adjacent and continuously integral homogeneous with left end section 12. Corrugated right end section 34 is identical to corrugated middle section 11 of FIG. 1A, but is now at one end instead of in the middle. As with FIGS. 1A and 1C, the corrugated section of FIG. 5A (and the remaining figures) is tapered, like the smooth sections. The blank is continuous, integral, and homogeneous, with sections 12 and 32 being smooth and distinguished or separated by a broken fold line 36. Section 34 is corrugated or scored (see discussion of FIG. 9 infra) by a standard die-cutting operation (not illustrated). The entire blank preferably is die cut from a larger starting sheet. Except for the above-noted distinguishing features, the blank of FIGS. 5A and 5B is similar to the blank of FIG. 1A.

Figure 5C:
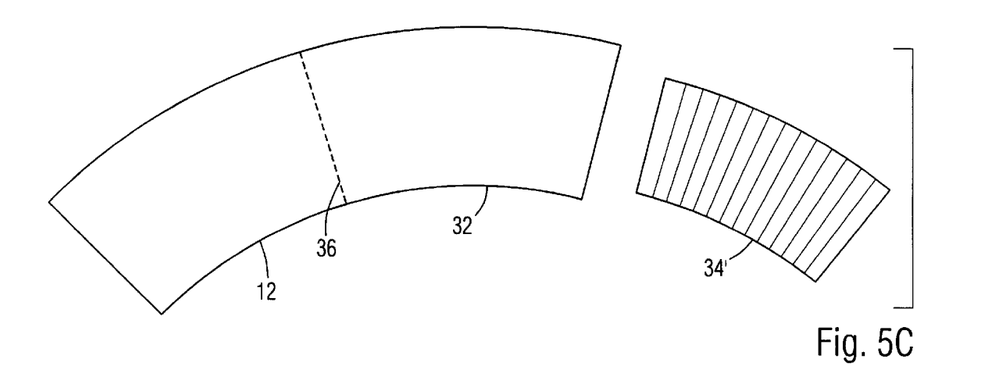
FIG. 5C is a plan side view similar to FIG. 5A, but where the side component is initially in two parts.

While FIG. 5A shows a single continuously integral starting blank, the starting blank may be formed from two separate portions, as shown in FIG. 5C. One portion, consisting of left end section 12 and middle section 32, is smooth and continuously integral or homogeneous, and the other portion, consisting of corrugated or otherwise insulating portion 34', is separate and is formed separately. As shown in FIG. 5C, insulating portion 34' is not as high or as long as sections 32 or 12. Then the two separate portions of FIG. 5C are glued together (operation not illustrated) along the leftmost one of the sections of the corrugated portion to form a blank similar to that of FIG. 5A. As stated above, cutting the two pieces separately may allow multiple types of sheet material to be used in fabricating sheet 20. E.g., recycled paper can be used for corrugated piece 34 and SBS can be used for smooth pieces 12 and 32.

Figure 6A:
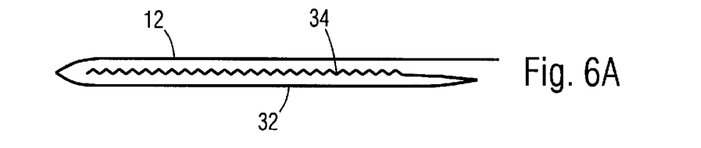
FIG. 6A is an edge view of the side component of FIG. 5A after folding.
Figure 6B:
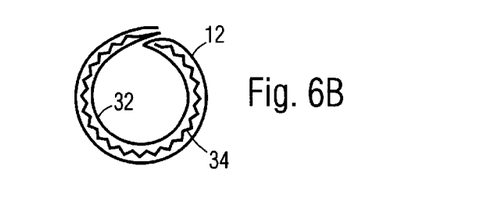
FIG. 6B is a top view of the side component of FIG. 5A after wrapping into a conoidal shape.

The blank of FIG. 5A (or FIG. 5C after gluing) is then folded a first time so that corrugated section 34 is adjacent and parallel to middle, smooth section 32. Left end portion 12 is then folded over the corrugated portion so that all three sections are parallel and the corrugated portion is sandwiched between the two smooth portions, as shown in FIG. 6A. In lieu of gluing section 34' along the edge of section 32 and folding section 34' inwardly, section 34' may be disposed on section 32 in a centered position, thereby requiring only that section 12 be folded over. Then the folded blank is wrapped or bent around a mandrel (not shown) to form a conoid, as shown in FIG. 6B. The ends of the blank are the sealed together such that the folded edge between sections 12 and 32 is on the inside of the conoid, as shown in FIGS. 6A and 6B, as with the embodiment of FIG. 4, the bottom (not shown) of the cup is attached in a similar manner, and it is finished in the same manner as with FIG. 4. A cup made from the conoid of FIG. 6B has all of the advantages of the cup of FIG. 4. It can be fabricated from a blank (FIG. 5A) in which the corrugated section is at one end, rather than in the middle, thereby providing an alternative starting blank.

If the sidewall blank of FIGS. 5A, 5C, or 7A (discussed below) is coated with a waterproof material on just one side, the finished cup will have the advantage of a waterproof coating facing both the inside and the outside of the cup. This is because of the way the blank is folded. This may be desirable for cold drinks, i.e., the outer shell can be protected from condensation without coating both sides of the blank. This reduces costs and provides a cup that is more biodegradable and recyclable.

FIGS. 7A to 8B—Two-Layered Cup

Cups formed from the container blanks shown in FIGS. 7A to 8B are similar to cups of the previous embodiments, but have sidewalls which include two layers instead of three and are thus are more economical and simpler to fabricate.

Figure 7A:
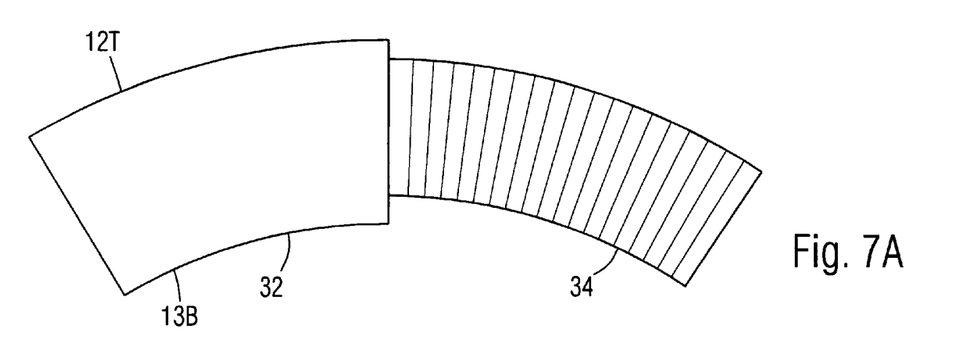
FIG. 7A is a plan view of a blank sheet for making an insulated two-layered cup employing a one-piece side component having an end corrugated section, in accordance with yet another embodiment of the invention.
Figure 7B:
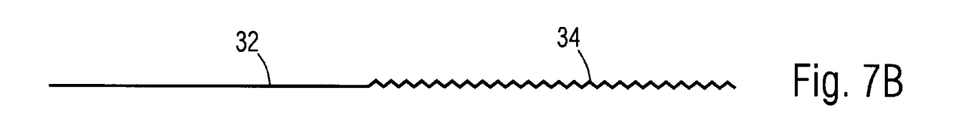
FIG. 7B is an edge view of the sheet blank of FIG. 7A.
Figure 8A:
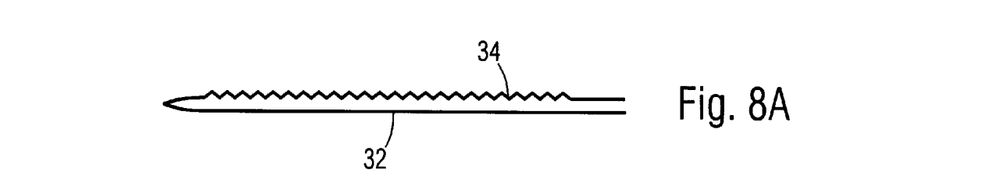
FIG. 8A is an edge view of the side component of FIG. 7A after folding.
Figure 8B:
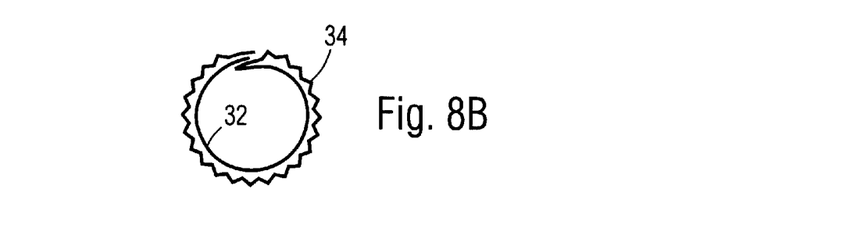
FIG. 8B is a top view of the side component of FIG. 5A after wrapping into a conoidal shape.

As shown in FIGS. 7A and 8B, the sidewall blank includes a substantially flat or smooth left section 32, and a right corrugated section 34, both of which are substantially identical to their respective counterparts shown in FIG. 5A. The two sections may be formed as a homogenous piece as shown in 5A or of two separate pieces (not shown) which are glued together form a unitary strip of deformable sheet material as shown in FIG. 7A.

The illustrated strip (FIGS. 7A and 7B) is folded once along a common fold line at the junction of sections 32 and 34. This brings the two sections into face-to-face engagement with each other to form a multi-layered container sidewall blank. The blank has an end portion at the left end of the blank defined by the common fold line and another end portion at the right end of the sidewall blank formed by the free ends of sections 32 and 34. The integral corrugations formed in section 34 define depressions in the face of this section. These depressions cooperate with the associated face of section 32 when the two sections are brought together in face-to-face relation to each other to form a plurality of air spaces between sections or layers 32 and 34 which comprise the two-layered blank shown in FIG. 8A.

The sidewall blank (FIG. 8A) is then wrapped around a mandrel (not shown) to bring the opposite end portions of the blank into overlapping relation to each other. Thus, as shown in FIG. 8B, the free end portions of sections or layers 32 and 34 are brought into overlapping relation with a marginal portion of the opposite or folded end of the blank. The overlapping portions are joined to each other to form a continuous container sidewall, such as generally shown in FIG. 8B. This joining operation forms the side seam of the cup and is performed while the cup sidewall blank is supported on the mandrel, in a manner well known in the cup and container making art.

The shape of the mandrel used to form the container will vary and will be determined by the shape of the container to be formed. The folded sidewall blank formed from the flat strip shown in FIG. 7A is particularly adapted for use in making a conoidal paper cup having a substantially circular cross section throughout its height. Therefore a conoidal mandrel will be employed for making such a cup.

In accordance with the presently preferred cup construction, smooth layer 32 forms the inner surface of the cup, whereas corrugated layer 34 defines a portion of the exterior surface of the container.

While the container sidewall blank remains in position on the mandrel, the bottom of the cup is attached to the sidewall by a rolling or crimping operation and a bead is preferably rolled around the upper end of the cup sidewall blank to complete cup assembly.

Figure 9:
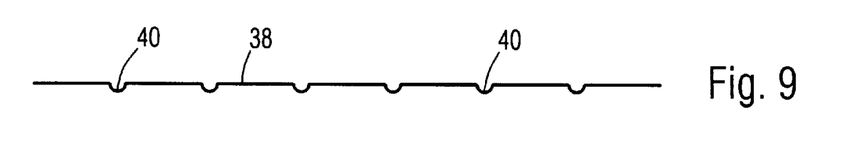
FIG. 9 is an edge view of an alternative-insulating layer employing spaced grooves.

FIG. 9—Alternative Insulating Layer

In lieu of a corrugated insulating layer, the insulating layer in any embodiment may be made of a flat sheet 38 (FIG. 9). This sheet has spaced, parallel grooves or scores 40 formed in one surface and separated by flat portions on the one surface of the sheet, i.e., the top surface as shown in FIG. 9. The corresponding lands or integral ribs produced by forming these grooves extend down from the lower face of the sheet, as shown in FIG. 9. When the ribs on the lower face of the scored layer 38 are brought into face-to-face engagement with an associated face of a smooth layer, air spaces are created between the ribs and provide effective insulation. Preferably the grooves or scores are about 5 to 10 mm apart and are about 1–3 mm deep. The scores are formed or embossed into the surface of the sheet by a die, which displaces the sheet material to create the indentations. Preferably the sheet in FIGS. 1A, 5A or 7A is cut and scores 40 are simultaneously formed in a single blanking operation. Also the sheet is preferably oriented so that the lands face the inside of the container, but the opposite arrangement can also be used.

Figure 10A:
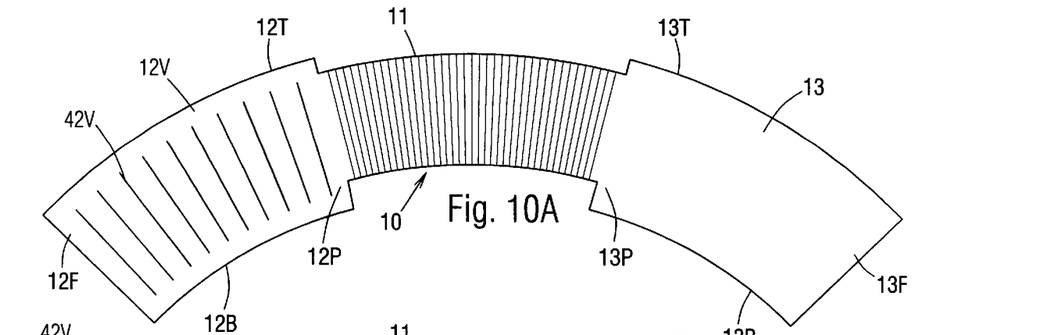
FIGS. 10A to 10D are views of cup blanks prior to folding and wrapping; the blanks have vertical ribs, horizontal ribs, graphic designs, and dimple embossing on their outer shells, according to the invention.
Figures 10A, 10B:
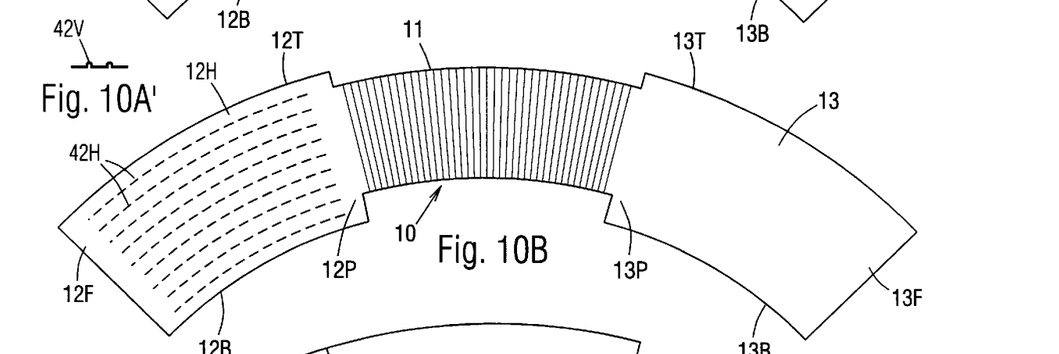

FIGS. 10A and 10B—Outer Layers with Embossing

The outer layers of the cups of the invention can be embossed or distorted, as shown in FIGS. 10A to 10D.

Such distortions can comprise any type that increase the thickness of the layer or create air spaces between it and the next layer.

The distortions are vertical ribs 42V in FIG. 10A on left section 12V. The ribs may extend for less than the height of the section so as to leave non-ribbed horizontal sections at the bottom and top as shown. Each rib can have a U-shaped cross section, as shown at 42V in FIG. 10A'. Flat, unembossed sections, as shown can separate the ribs. Such ribs can be stamped when the middle section of the blank is embossed or corrugated, using a suitable die or embossing plate. In one embodiment the ribs were 1.3 mm (50 mils) wide, 0.25 mm (10 mils) high, with adjacent ribs separated by 3.8-mm (150-mil)flat sections, but obviously these dimensions can be varied widely.

In lieu of vertical ribs, such distortions can comprise horizontal ribs 42H as shown in FIG. 10B on left section 12H. The ribs may extend for less than the width of the section so as to leave non-ribbed vertical sections at the right and left sides of section 12H as shown. Each rib can be the same size, shape, and separation as those of FIG. 10A.

Figure 10C:
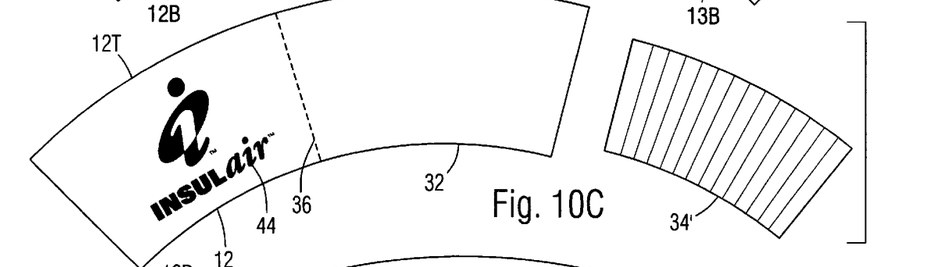

In lieu of ribs, such distortions can comprise an embossed (raised or relief) or intaglio (depressed or engraved) graphic design or trademark 44, as shown in FIG. 10C on left section 12T. Such a design can be stamped just before the blank is cut, at the time of cutting, or just after, with a suitable die. For a paper blank having a thickness of about 0.25 to 0.56 mm (10 to 22 mils), the design can be embossed or stamped to extend 0.10 to 0.40 mm (4 to 16 mils) above or below the surface of the blank. As shown in FIG. 10C, the actual trademark area occupies about 20% of the area of section 12T, but larger or smaller area marks may be used, depending upon aesthetics and the size of the gripping area and the desired insulating properties.

Figure 10D:
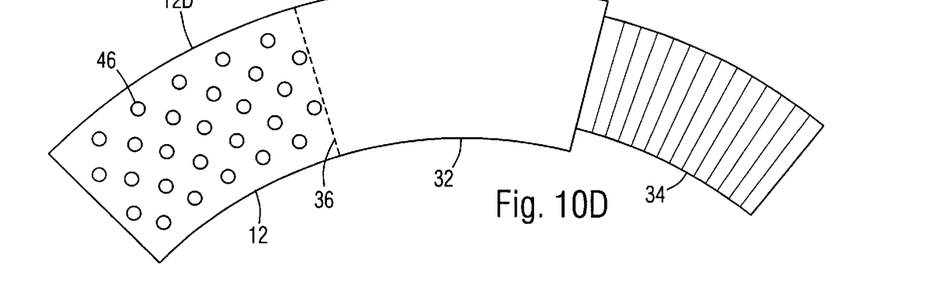

In lieu of ribs or a trademark, such distortions can comprise an array of dimples 46 as shown in FIG. 10D on left section 12D. The dimples may cover most of the area of the section as shown.

In lieu of the four types of distortions shown, zigzag, wavy, diamond, triangular, rectangular, all-text, etc. embossing can be used.

After forming the distortions, the cup is formed in the manner described above. The left layer (with distortions) will form the outer layer of the cup and the embossing will provide a cup which is more thermally insulating due to the increased thickness it creates for the cup. This will make the cup more comfortable to handle and will maintain the temperature of its contents longer. The cost of manufacture will not be increased since the embossing can be done when the corrugated center layer is formed. Due to the embossing, the cup will have less tendency to slip down through a holder's fingers, especially when filled with liquid. Also the embossing provides a reduced area of hand contact when the cup is held so as to reduce the amount of heat transmission, whether the cup is filled with cold or hot liquid. When the embossing is a design, the cup does not have to be printed; this saves ink, natural resources, production costs, and production steps and makes recycling easier. Moreover, due to its three-layered construction, embossing will not create holes that will cause leaks in the cup.

If the embossing on the outer layer opposes the distortions on the middle layer, increased air space and hence increased insulation will be provided between the middle and outer layers. E.g., if the middle layer has vertical corrugations and the outer layer has horizontal ribs, the crests of the horizontal corrugations will cross the crests of the vertical ribs to hold the layers farther apart. Similarly if the middle layer contains horizontal ribs or corrugations, the outer layer can have vertical ribs, for the same result. Orthogonal diagonal ribs can also be used, as can circular and straight ribs for the two layers.

Figure 11A:
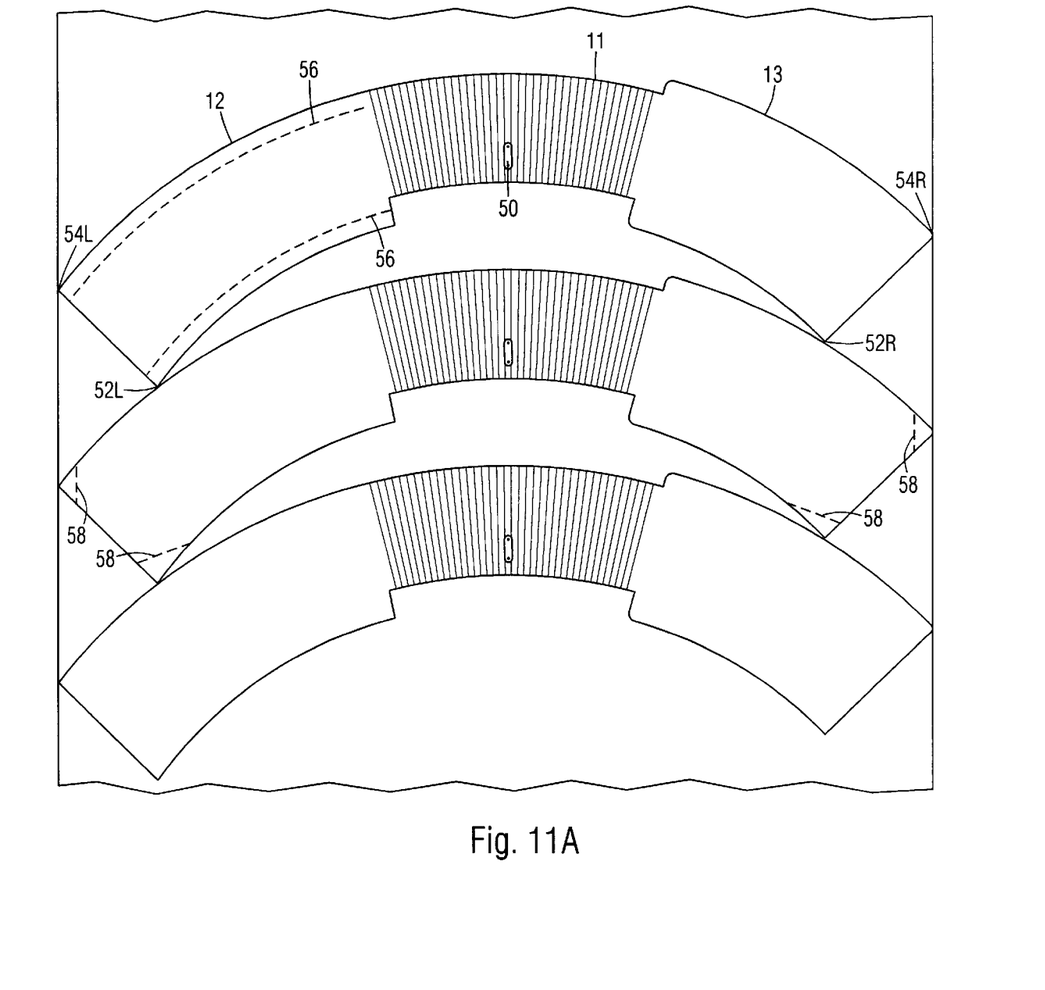
FIGS. 11A and 11B are views of cup blanks cut from a flat paper sheet according to a prior art layout and a layout according to the invention, respectively.
Figure 11B:
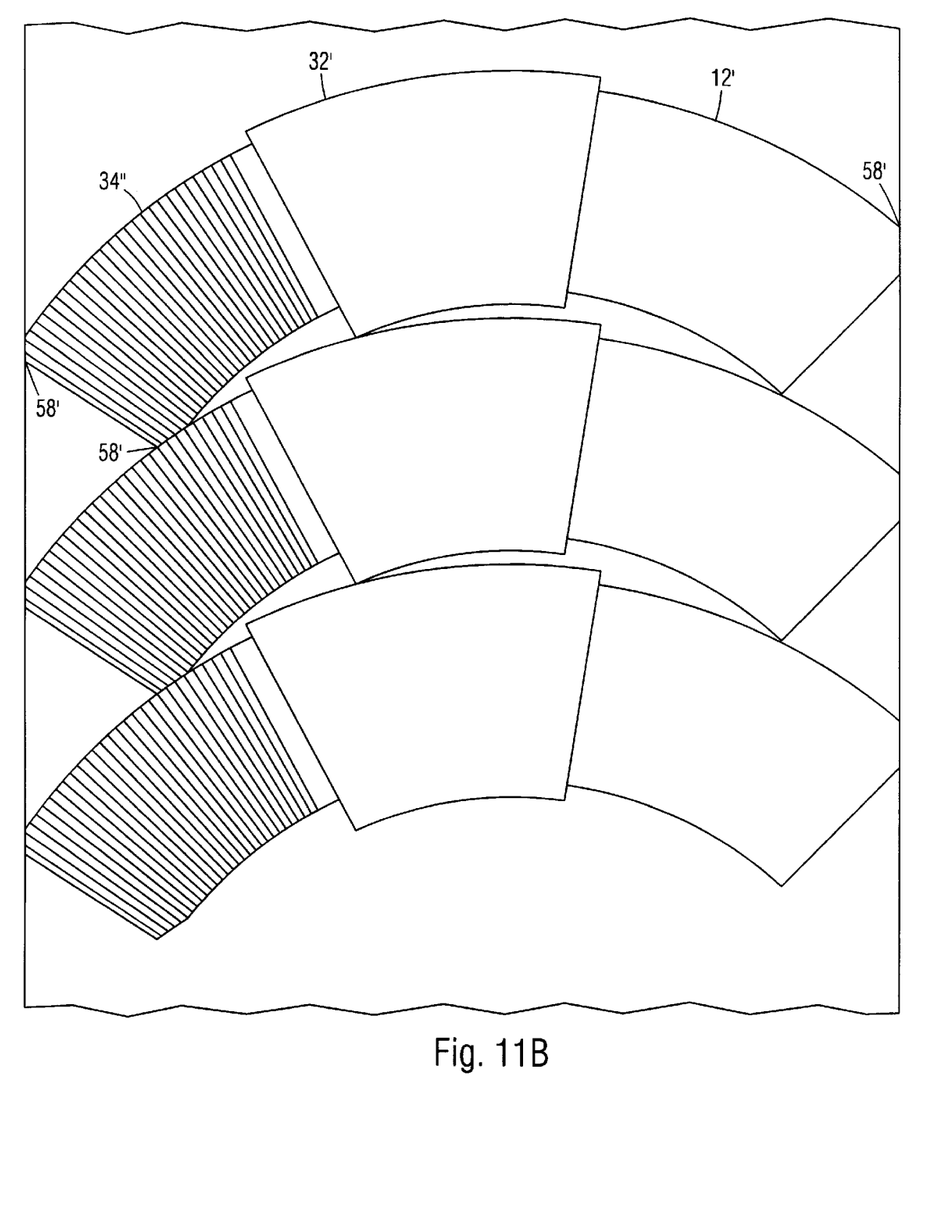

FIGS. 11A and 11B—Blanks with Trimmed Portions

In the embodiment shown in FIGS. 11A and 11B, the blanks for forming respective cups are trimmed at their corners and their tops and bottoms to reduce waste on the master sheet from which the blanks are cut. This saves materials and provides a more efficient and more economical method of production.

Ignoring the broken lines temporarily, FIG. 11A shows a section of a sheet with three cup blank outlines drawn on the sheet to show the cut lines by which a cutting die (not shown) will cut out the blanks from the sheet. The three blank outlines are identical and each comprises two undistorted or smooth end sections 12 and a center distorted, e.g., corrugated, section 11. Section 11 has a glue hole 50 as mentioned above. Note that the blank outlines are placed on the sheet as efficiently as possible, i.e., they are contiguous so as not to waste material. Specifically, the bottom corners 52L and 52R of the top blank's outline are contiguous with the tops of the end sections of the middle blank outline. Also the top corners 54L and 54R of the top blank's outline are adjacent the left and right edges of the sheet, respectively, so that the sheet can be made as narrow as possible, thereby again to conserve material. After the blanks as shown are cut from the sheet, they are folded in zigzag fashion so that distorted center section 11 is sandwiched between smooth outer sections 12 and 13. Then the blank is formed on a conoidal mandrel (not shown) to form a three-layered conoidal cup, such as shown in FIG. 4. In the cup, section 13, which is taller, will be the inside layer and section 12 will be the outside layer. The top portions of layers 12 and 13 will be rolled or curled over and out to form a rim of the cup.

In accordance with the invention, the blank outlines are trimmed as indicated by the broken lines so as to compress the outlines closer vertically and narrow them horizontally. This enables more blanks to be obtained from a narrower sheet.

As illustrated in the top blank, in one embodiment, section 12 is made shorter in height as indicated by broken lines 56, which are new cut lines of the blank outline. If the blank is tapered as shown in FIG. 11A, these cut lines will be curved, and if the blank is straight (not shown), these cut lines will be horizontal. Preferably every blank is shortened as indicated by cuts 56, but these cuts 56 are illustrated on only the top blank for clarity. The length of the section may be reduced by about 10% by each of the upper and lower cuts, for a total height reduction of 20%.

It will be apparent that as a result of shortening cuts 56, more blanks can be cut from a given length of sheet, and the sheet can be made narrower. Since section 12 will be the outside layer in the finished cup, its shorter profile will expose top and bottom marginal portions of corrugated middle layer 11. This will illustrate to users that the cup has a corrugated (and hence insulating) middle layer.

Every blank may also be cut so as to have chamfered corners, as indicated by corner cut lines 58, shown on just the middle blank for clarity. As with the above shortening cut embodiment, it will be apparent that as a result of chamfer cuts 58, more blanks can be cut from a given length of sheet, and the sheet can be made narrower. Each chamfer cut may be approximately in the form of a 90°-60°-30° right triangle, with the base at the side edge of the section. The size of the chamfer may be such that the base of each triangle extends about 10% of the height of its section. Alternatively the cuts may be curved or rounded.

Figure 12A:
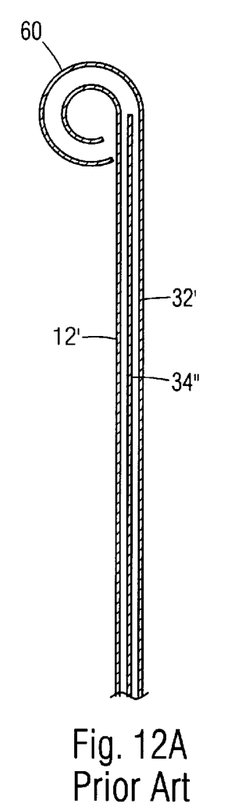
FIG. 12A shows a side-sectional view of the wall of a three-layered prior-art cup wall having curled down the inner and outer layers.

FIG. 11B shows blanks similar to those of FIG. 5A, where the smooth sections, here designated 12' and 32', are contiguous and provide the middle and right side sections and the corrugated or distorted section 34" forms the left end section. The cup is formed from this blank by folding it twice as follows: corrugated layer 34" is folded over layer 32' and layer 12' is then folded over layer 34" so that layer 34" is sandwiched between layers 32' and 12'; this is termed a gate fold. Then the folded arrangement is formed on a conoidal mandrel (not shown) so that it forms a conoidal cup with layer 32' on the inside, layer 34' as the middle layer, and layer 12' on the outside. The top edge of layers 32' and 12' are rolled over and out to form the top rim of the cup, as shown in FIG. 12A.

In accordance with the invention, the upper and lower outer corners 58' of sections 34" are removed in the die-cutting operation. As a result, the width of the sheet from which the blanks are cut can be made narrower and more blanks can be cut from a sheet since each blank takes less vertical space. The removal of corners 58' from sections 34" will not affect the appearance or function of the finished cups. This is because section 34" is the middle layer, which does not show in the finished cup and since the removal of a corner will still leave the same insulating space between the inside and outside layers. Section 34" may also be shortened horizontally, i.e., part of its left end as shown in the drawing may be removed, to save additional material.

Additionally corners 58' may be removed from the upper corners of sections 12' to enable an even narrower sheet to be used. Again, the removal of these corners will not affect the appearance of the finished cups since the sealing edges will overlap the removed corner portions.

FIGS. 12A to 12D—Cups with Top Rim Curled from Multiple Layers

When the three-layered cups are formed according to the invention, as stated, inner and outer layers 12' and 32' have been rolled over and out to form a top rim 60 as shown in FIG. 12A. This rim provides a comfortable surface for the drinker's lips and also makes the cups more rigid. After rolling the rim, the inner layer has a greater circumference or must be rolled a greater distance than the outer layer. Thus the height of inner layer 32' is greater than that of outer layer 12'.

In accordance with another aspect of the invention, the rim can be formed from a single layer or different layers.

Figure 12B:
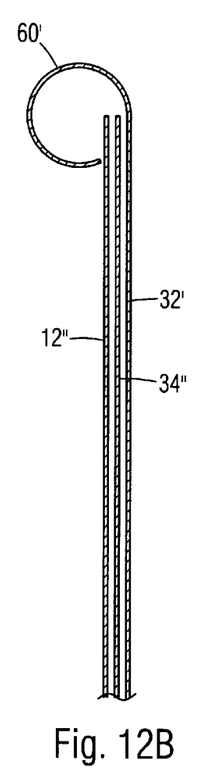
FIG. 12B shows the same view with the top rim of the inner layer curled down.

As shown in FIG. 12B, the rim (60') is formed from just inner layer 32' In this case the outer layer (12") is made shorter since it does not have to be rolled. The advantage of this embodiment is that the inner layer can be made shorter, thereby saving material and enabling more sections to be formed from a narrower sheet.

Figure 12C:
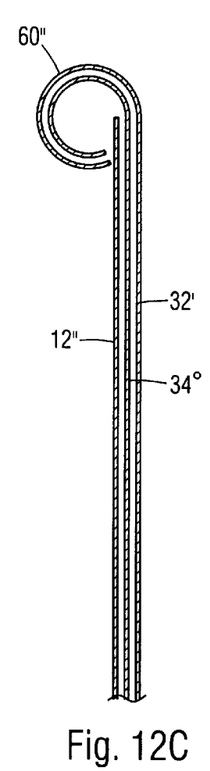
FIG. 12C shows the inner and middle layers curled down.
Figure 12D:
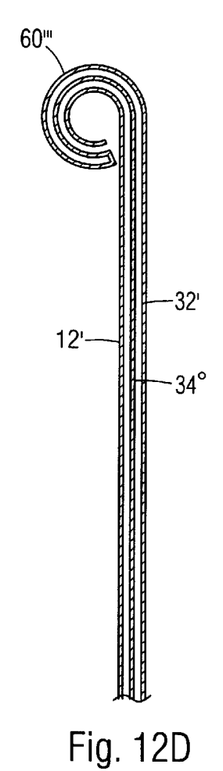
FIG. 12D shows the inner, middle, and outer layers curled down, according to the invention.

As shown in FIG. 12C, the rim (60") is formed from inner layer 32' and middle layer 34°. In this case the outer layer (12") is made shorter as in the embodiment of FIG. 12B, but the middle, distorted layer (34°) is made longer since it must be rolled. The advantage of this embodiment is that the rim is two-layered and hence stronger and can be made by a different process with adjacent layers forming the rim. As shown in FIG. 12D, the rim (60''') is formed from inner layer 32', middle layer 34°, and outer layer 12'. In this case the outer layer (12') is made longer as in the embodiment of FIG. 12A. Also the middle, distorted layer (34°) is also made longer, as in the embodiment of FIG. 12C. The advantage of this embodiment is that the rim is three-layered and hence even stronger and can be made by a different process with three adjacent layers forming the rim.

Conclusions, Ramifications, and Scope

Accordingly the reader will see that we have provided several embodiments of thermally insulated cups or containers which will maintain the temperature of their contents much longer than non-insulated cups. When any container is holding a hot or a cold beverage, it will maintain its outer shell at close to ambient temperature, so that it will be comfortable to handle. When it is holding a cold beverage, it will also prevent condensation from forming on its outer shell, so that it will not become slippery. The corrugated, multi-layered construction makes it strong enough to withstand prolonged handling. Its paper (or other suitable sheet material) construction and its minimal use of adhesive makes it environmental friendly. Its design allows it to be made of thinner paper and thereby makes very efficient use of paper stock, so that it consumes a minimal amount of natural resources. Because its three or two layers are constructed by simply folding and winding a single sheet of paper in a single wrapping operation, it can be easily and inexpensively manufactured with existing machinery. Unlike conventional corrugated boxboard, the layers of its folded blank are not permanently fixedly adhered to one another, so it can easily be wrapped into a conoidal shape prior to sealing.

Although the above description contains many specificities, they should not be considered as limitations on the scope of the invention, but only as examples of the preferred embodiment. Many other ramifications and variations are possible within the teachings of the invention.

For example, instead of paper, other suitable materials, such as biodegradable plastic, if available, other plastic, metal, stiff fiber, etc. can be used. The reflective coating can be eliminated.

The cups may be produced in an in-line manufacturing process in which elongated blanks (e.g., those of FIGS. 1A, 5A, or 7A) are fed into a machine which folds the elongated blanks into a multi-layered arrangement (e.g., those of FIGS. 2A, 6A, or 8A). Then the blanks are automatically transferred into position on a cup machine to be wrapped around a mandrel (FIGS. 2B, 6B, or 8B) to be formed into finished cups. This in-line manufacturing process of folding and wrapping requires only modest modifications or attachments to standard cup-forming machines and saves time and costs.

The separate elongated pieces shown in FIGS. 1C and 5C, and used as an alternative to FIG. 7A can be crimped instead of glued together. The ends of the middle-corrugated portion (FIG. 2B) may be glued or crimped together. The portion used for the smooth outer shell in FIGS. 1 to 6 may be shorter than the portion used for the smooth inner shell. In this case only the top edge of the inner shell need be rolled outwardly to form the rim, and only the bottom edge of the inner shell need be folded inwardly to seal the bottom. In FIG. 5C, corrugated or otherwise insulating portion 34' may be glued in a centered and parallel position on smooth section 32, thereby requiring only that left end portion 12 be folded over the corrugated section to make all three sections parallel.

The construction method of forming a multi-layered cup from a continuous sheet can be used for creating types of insulated containers, such as milk cartons, ice cream cartons, orange juice- or biscuit-type (composite) cans, etc. In lieu of the conoidal cups shown, the mandrel may be cylindrical so that the finished cup may be cylindrical, rather than conoidal.

The corrugated portion can be formed by die cutting as one or more thin, parallel, spaced strips that connect the two smooth end portions. Instead of vertical corrugations or grooves, the middle layer can employ any other type of distortion, embossing, or spacing means to create air pockets or spaces between the inner and outer shells. E.g., the insulating layer can use dimples (round or elongated), horizontal or diagonal ridges or ribs, or any other type of distorted sheet material, including porous sheet material, material with holes, or even foamed material, to make it insulating. Instead of the corrugated layer being on the outside as shown in FIG. 8B, the layers may be reversed so that the corrugated layer is on the inside and the smooth layer is on the outside. The corrugated portion can be rectangular, instead of tapered. In this case it can be wrapped around tapered inner shell 13S by spreading or fanning its corrugations wider at its top, or by making the corrugations deeper at the bottom and shallower at the top to convert it into a tapered (conoidal) shape.

The interconnections between the elements can be varied, as can their dimensions, materials and shapes. Also the sizes of the marginal height reductions in FIG. 11A and the sizes and shapes of the corner chamfer cuts in FIGS. 11A and 11B can be varied.

Therefore the scope of the invention should be determined by the appended claims and their legal equivalents, and not by the examples given.

We claim:

1. An insulating cup, comprising:

an enclosing sidewall having a lower end and an open top, a bottom sealing said open end, said sidewall comprising three layers, namely an inner layer, a middle layer, and an outer layer, said middle layer comprising insulating material, said outer layer having deformities which provide insulating air space adjacent said outer layer, said inner and outer layers being formed from a folded sheet.

2. The insulating cup of claim 1 wherein said outer layer is shorter, in the direction of said lower end to said open top, than said inner layer, such that said outer layer covers less than 100% of said outer layer, thereby saving material.

3. The cup of claim 1 wherein said deformities of said outer layer comprise an embossed design, thereby providing a message.

* * * * *

UNITED STATES PATENT AND TRADEMARK OFFICE
CERTIFICATE OF CORRECTION

PATENT NO. : 5,964,400
DATED : OCT 12, 1999
INVENTOR(S) : R. VARANO AND C. E. SADLIER

It is certified that error appears in the above-identified patent and that said Letters Patent is hereby corrected as shown below:

On the Title page, after item [76] please add item --[73] Assignee:

Sherwood Tool Incorporated, Kensington, CT;
Insulair, Inc., San Francisco, CA ; part interest to each --.

Signed and Sealed this

Nineteenth Day of September, 2000

Attest:

Q. TODD DICKINSON

*Attesting Officer*     *Director of Patents and Trademarks*